United States Patent [19]

Yoshino

[11] Patent Number: 5,138,556
[45] Date of Patent: Aug. 11, 1992

[54] MALFUNCTION DETECTOR FOR ANTISKID CONTROLLER AND SPEED SENSOR

[75] Inventor: Masato Yoshino, Itami, Japan

[73] Assignee: Sumitomo Electric Industries, Ltd., Osaka, Japan

[21] Appl. No.: 607,665

[22] Filed: Nov. 1, 1990

Related U.S. Application Data

[62] Division of Ser. No. 232,857, Aug. 16, 1988, abandoned.

[30] Foreign Application Priority Data

Aug. 19, 1987 [JP] Japan .................. 62-205830

[51] Int. Cl.$^5$ .................. G06F 15/20; B60T 8/88
[52] U.S. Cl. .................. 364/426.02; 303/92; 303/100
[58] Field of Search .................. 364/426.02; 303/92, 303/93, 100, 102, 103, 110, 113, 119

[56] References Cited

U.S. PATENT DOCUMENTS

| | | | |
|---|---|---|---|
| 4,493,210 | 1/1985 | Fries et al. | 303/92 |
| 4,530,059 | 7/1985 | Brearley et al. | 364/426.02 |
| 4,700,304 | 10/1987 | Byrne et al. | 364/426.02 |
| 4,701,854 | 10/1987 | Matsuda | 364/426.02 |
| 4,755,946 | 7/1988 | Lin | 364/426.02 |
| 4,824,183 | 4/1989 | Uchida et al. | 303/92 |
| 4,836,616 | 6/1989 | Roper et al. | 303/92 |

*Primary Examiner*—Parshotam S. Lall
*Assistant Examiner*—V. N. Trans
*Attorney, Agent, or Firm*—Cushman, Darby & Cushman

[57] ABSTRACT

An antiskid control device including a wheel speed detecting member, an antiskid processor member for performing arithmetic operation on the basis of a wheel speed signal from the wheel speed detecting member and issuing to a hydraulic circuit, first and second commands of reducing and increasing a braking pressure upon detection of trends of wheels towards locking and towards recovery from locking, respectively, a solenoid driving member for driving a solenoid for a pressure control valve of the hydraulic circuit in accordance with the first and second commands and a decision member for deciding that the wheel speed detecting member is malfunctioning when a state that the arithmetic and locking state detecting member does not issue the first command to the hydraulic circuit during a first predetermined time period has not been detected at all during a second predetermined time period.

2 Claims, 3 Drawing Sheets

MALFUNCTION DETECTOR FOR ANTISKID CONTROLLER AND SPEED SENSOR

This is a division of application Ser. No. 07/232,857, filed Aug. 16, 1988 now abandoned.

BACKGROUND OF THE INVENTION

The present invention generally relates to an antiskid control device for a motor vehicle and more particularly, to an antiskid control device which is provided with a detection means for detecting malfunctioning of a wheel speed detecting means including a wheel speed sensor.

Conventionally, in wheel speed detecting means, it has been so arranged, for example, that after rotation of a gear fixed to a wheel has been detected as an AC signal by a magnetic pickup attached to a vehicle body, the AC signal is converted into a pulse train by an interface circuit such that either this signal of the pulse train is converted into a digital value indicative of the wheel speed by a time counting and counting circuit and an arithmetic circuit or the pulse train is transmitted to a F/V converter so as to be converted into a voltage corresponding to the wheel speed. A method is known in which when the pulse train or the digital value indicative of the wheel speed or the voltage corresponding the wheel speed cannot be suddenly obtained at all due to a malfunction in these circuits, a decision is made as to whether the malfunction is caused by locking of the wheels or disconnection, etc., by comparing a deceleration at that time with mechanically possible maximum deceleration based on, for example, inertia of the wheels.

However, in the known method, if the digital value indicative of the wheel speed or the voltage corresponding to the wheel speed exhibits, due to fracture of some of teeth of the gear or malfunctioning of the F/V converter, changes indistinguishable from those of a state of periodical repetition of locking of the wheels, it is decided as if locking of the wheels and recovery of the wheels from locking are repeated. Thus, in this case, pressure reduction and pressure increase are repeated endlessly in a brake device. Furthermore, known antiskid control devices usually increase pressure slowly also after completion of pressure reduction through repetition of, for example, pressure holding and pressure increase such that the wheels are not locked again immediately. As a result, in the known antiskid control devices, such a phenomenon may take place that even if a driver fully kicks a brake pedal, the brake is hardly applied.

SUMMARY OF THE INVENTION

Accordingly, an essential object of the present invention is to provide, with a view to eliminating the disadvantages inherent in conventional antiskid control devices, an antiskid control device provided with a decision means which decides, when locking of wheels has been detected too many times during a predetermined time period, that it is an abnormal state.

In order to accomplish this object of the present invention, an antiskid control device according to the present invention comprises: a wheel speed detecting means; an antiskid processor means which performs arithmetic operation on the basis of a wheel speed signal from said wheel speed detecting means so as to issue to a hydraulic circuit, first and second commands of reducing and increasing a braking pressure upon detection that wheels are in a trend towards locking and in a trend towards recovery from locking, respectively; a solenoid driving means which drives a solenoid for a pressure control valve of said hydraulic circuit in accordance with the first and second commands of said antiskid processor means; and a decision means which decides that said wheel speed detecting means is malfunctioning when a state that said antiskid processor means does not issue the first command to said hydraulic circuit during a first predetermined time period has not been detected at all during a second predetermined time period.

In accordance with the present invention, in the case where locking of the wheels has been detected repeatedly at a short interval, either a combination of the commands of reducing and increasing the braking pressure or a combination of the commands of increasing and holding the braking pressure are issued repeatedly at a short interval such that antiskid control is performed. Thus, a state, in which an interval for successively issuing either the command of increasing the braking pressure or the commands of increasing and holding the braking pressure does not exceed the extremely short first predetermined time period, lasts the relatively long second predetermined time period. By properly selecting the first and second time periods, the above described repeated detection of locking of the wheels can be noticed and thus, it becomes possible to detect abnormality of the wheel speed detecting means.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout views of the accompanying drawings.

DETAILED DESCRIPTION OF THE INVENTION

Figure 1:
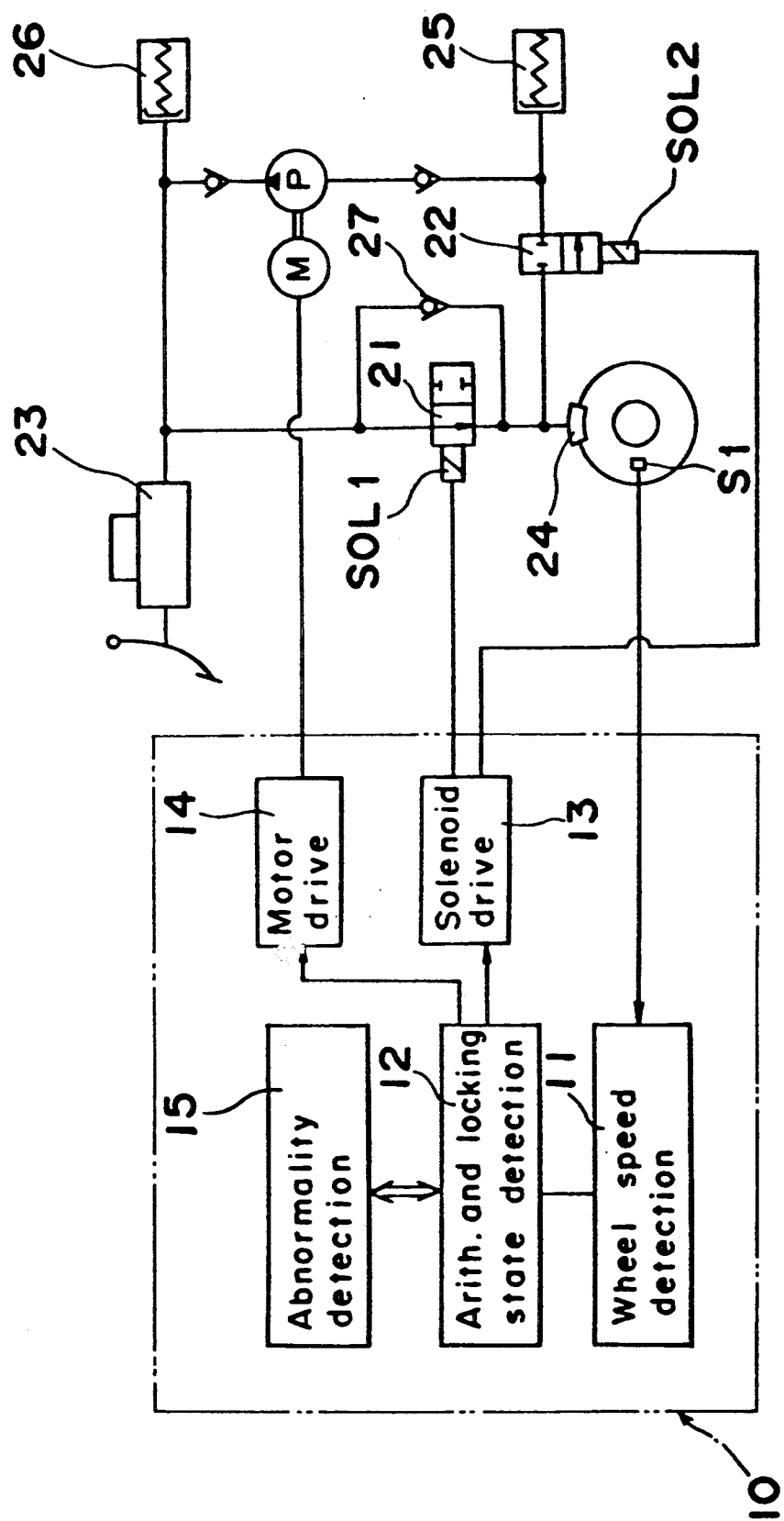
FIG. 1 is a schematic diagram of an antiskid control device according to the present invention.

Referring now to the drawings, there is shown in FIG. 1, an antiskid control device according to the present invention. The antiskid control device includes an electronic control device 10. Upon reception of signals from wheel speed sensors S1, S2, S3 and S4 provided at wheels of a motor vehicle, respectively, the electronic control device 10 performs various calculations and decisions so as to output a control signal of a hydraulic circuit. Hereinbelow, only the wheel speed sensor S1 is described for the sake of brevity.

An AC voltage signal from the wheel speed sensor S1 is converted into pulses. Then, the pulses are supplied, as a wheel speed signal, to an antiskid processor means 12 by a wheel speed detecting means 11 for performing count of the number of the pulses and calculation. By comparing a deceleration, an estimated vehicle body speed, etc. calculated by the antiskid processor means 12 with a reference value, the antiskid processor means 12 detects whether or not the wheels are in a trend towards locking. Namely, when the deceleration drops below a predetermined reference value or when a slip speed, i.e. a difference between the estimated vehicle body speed and the wheel speed exceeds a predetermined threshold value, the antiskid processor means 12 decides that the wheels are in a trend towards locking so as to issue a pressure reducing command to a solenoid driving circuit 13.

Then, the solenoid driving circuit 13 energizes solenoids SOL1 and SOL2, so that a pressure control valve 21 is displaced leftwards in FIG. 1 so as to cut off a hydraulic circuit from a master cylinder 23 to a wheel cylinder 24, while a pressure control valve 22 is displaced upwards in FIG. 1 so as to communicate a circuit between the wheel cylinder 24 and a reservoir 25. Meanwhile, a motor M is started by a motor driving circuit 14, so that brake fluid fed from the reservoir 25 is returned to an accumulator 26 and the master cylinder 23 by a pump P and thus, pressure of the brake fluid drops.

Subsequently, when the deceleration has exceeded the predetermined reference value or the slip speed has dropped below the predetermined threshold value upon recovery of the wheel speed from locking, the antiskid processor means 12 decides that a possibility of locking of the wheel has been removed and then, issues a pressure increasing command to the solenoid driving circuit 13. Hence, the solenoid driving circuit 13 de-energizes the solenoids SOL1 and SOL2 so as to reinstate the pressure control valves 21 and 22 to the states shown in FIG. 1. Thus, the hydraulic circuit between the hydraulic pressure generating source, i.e. the master cylinder 23 and the wheel cylinder 24 is communicated so as to raise a braking pressure.

Meanwhile, in the case where a pressure holding command is issued by interrupting the pressure reducing command or the pressure increasing command during issuance of the pressure reducing command or the pressure increasing command, the solenoid SOL1 is energized and the solenoid SOL2 is de-energized. Thus, the pressure control valve 21 is displaced leftwards in FIG. 1 so as to cut off the hydraulic circuit, while the pressure control valve 22 is disposed at the position shown in FIG. 1. Therefore, the hydraulic pressure is contained in the wheel cylinder 24 and thus, the braking pressure is maintained at a constant value. In FIG. 1, reference numeral 27 denotes a by-pass valve.

Meanwhile, condition and timing for issuing the pressure holding command during issuance of the pressure reducing command can be selected variously. For example, in one method, the pressure holding command is issued upon lapse of a predetermined time period from issuance of the pressure reducing command. In another method, the pressure holding command is issued when the wheel deceleration has exceeded a predetermined threshold value.

Likewise, condition and timing for issuing the pressure increasing command and the pressure holding command alternately can be selected variously. Generally, the pressure holding command is issued at a fixed interval by a pulse generator, etc.

Furthermore, decisions that the wheels are set in a trend towards locking and have recovered from locking can be made based on other factors in addition to the deceleration or the slip speed referred to above. Meanwhile, although FIG. 1 shows that the electronic control device 10 is directed to a single channel for controlling the single wheel cylinder 24, it is needless to say that the electronic control device 10 is actually directed to a plurality of channels for controlling a plurality of the wheel cylinders 24.

Figure 2:
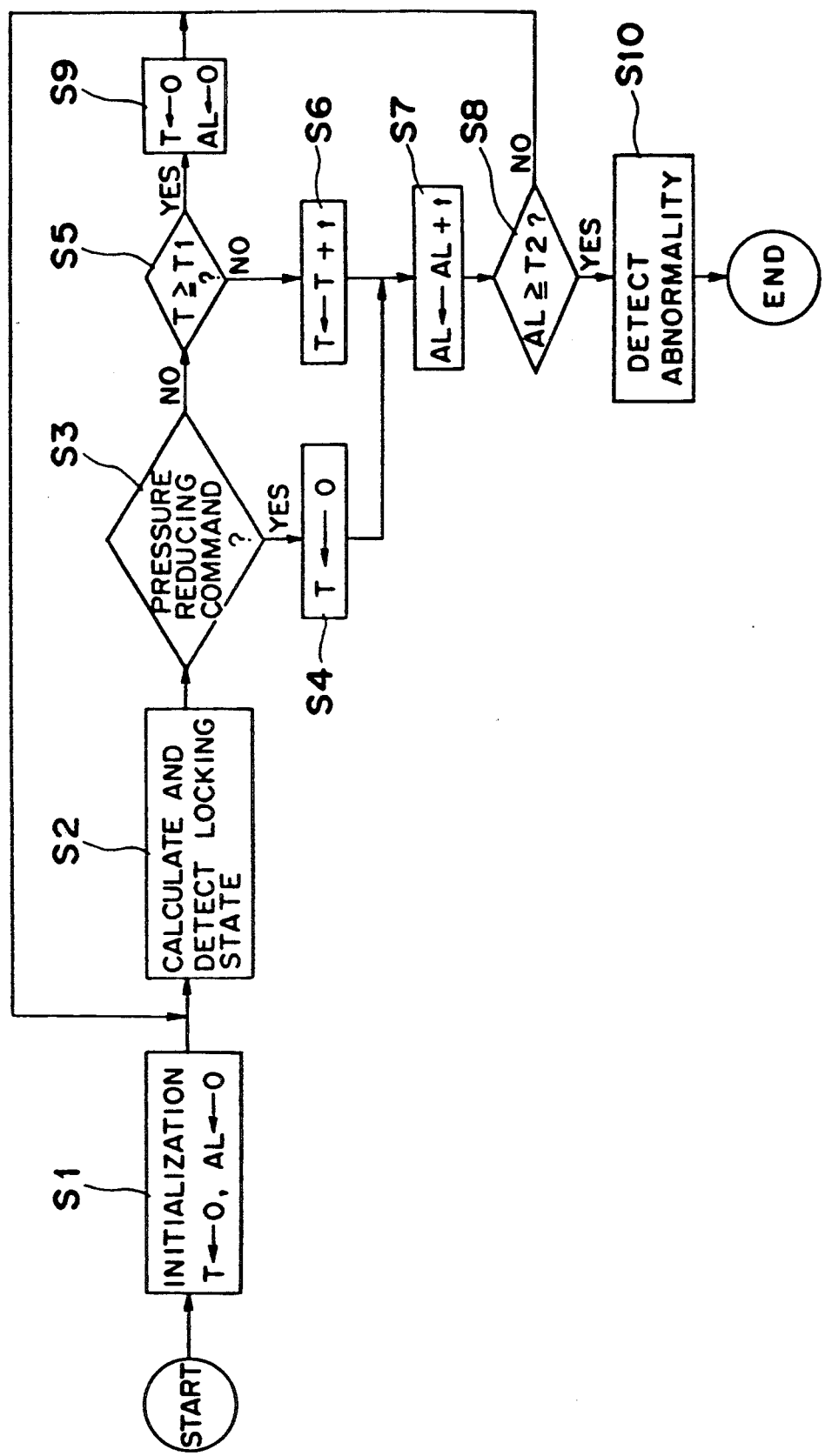
FIG. 2 is a flow chart showing a processing sequence of an abnormality detecting means employed in the antiskid control device of FIG. 1.
Figure 3:
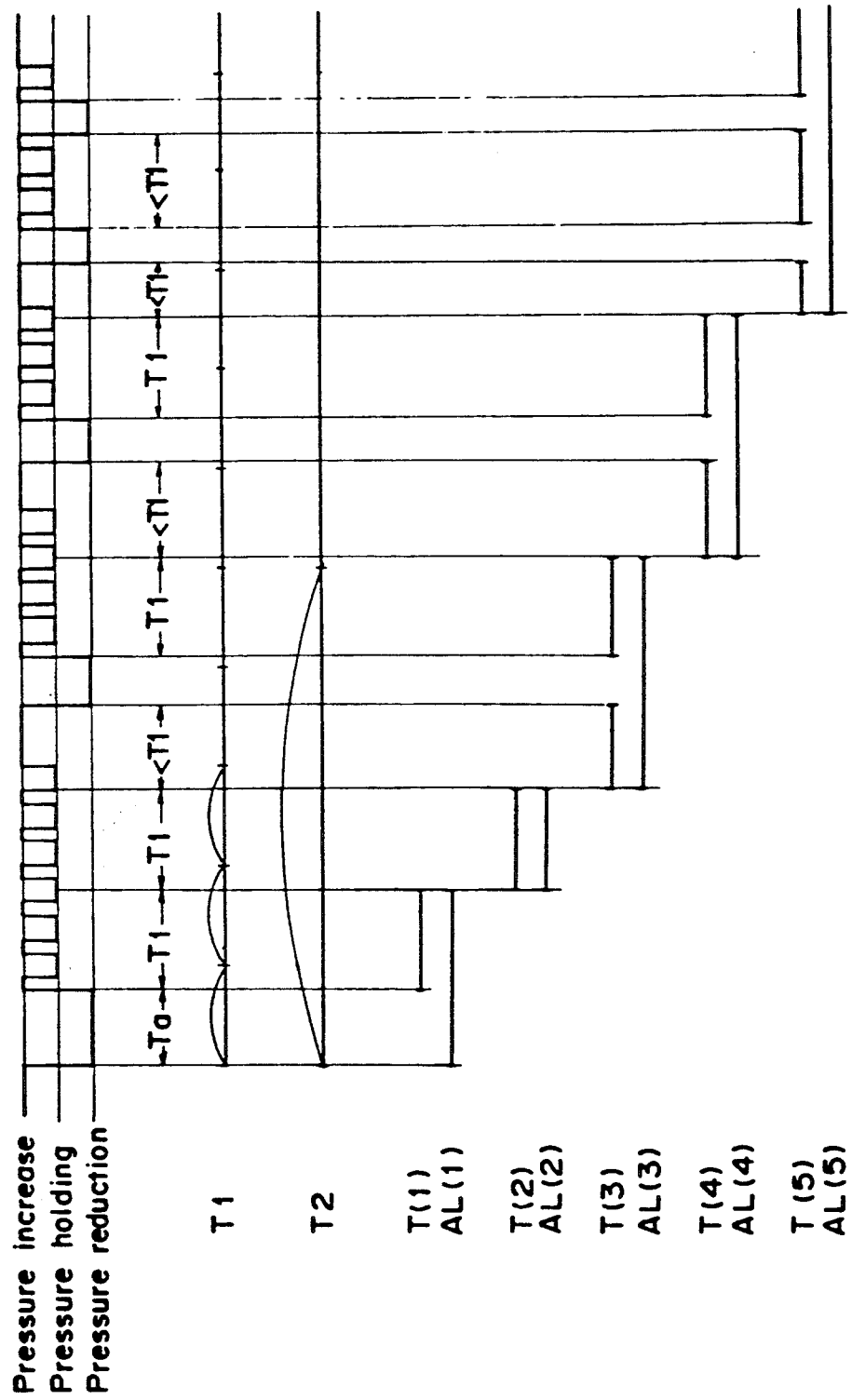
FIG. 3 is a diagram showing contents of timers employed in the antiskid control device of FIG. 1.

The electronic control device 10 further includes a detection means 15 for detecting abnormality of the wheel speed detecting means 11 on the basis of the pressure reducing command, the pressure increasing command and the pressure holding command. Hereinbelow, the detection means 15 is described with reference to FIGS. 2 and 3. It is supposed here that a first preset time period T1 and a second preset time period T2 are counted by timers T and AL, respectively and character t denotes a time period of one processing cycle. The pressure increasing command, the pressure reducing command and the pressure holding command are issued in such a sequence and at such timing as shown in FIG. 3. As shown in FIG. 2, initialization is performed by clearing the timers T and AL at step S1. Then, a routine corresponding to the arithmetic and locking stat detecting means 12 is executed for each of the channels at step S2. If it is found at step S3 that the pressure reducing command is issued in any one of the channels, the timer T is cleared at step S4 and the time period t is added to a count of the timer AL at step S7. Subsequently, at step S8, it is decided whether or not the count of the timer AL is equal to or greater than the second preset time period T2. Since the second preset time period T2 is of such a length as shown in FIG. 3, a decision of "NO" is made at step S8 and thus, the program flow returns to step S2.

If the pressure reducing command is issued for a time period Ta as shown in FIG. 3, the program flow proceeds through steps S2, S3, S4, S7 and S8 such that the time period Ta is added to the count of the timer AL. Since the pressure increasing command is, in turn, issued upon lapse of the time period Ta, a decision of "NO" is made at step S3 and thus, the program flow proceeds to step S5 at which a decision is made as to whether or not a count of the timer T is equal to or greater than the first preset time period T1. Since the count of the timer T is zero at this time, a decision of "NO" is made at step S5. Thus, the time period t is added to the count of the timer T at step S6 and the time period t is added to the count of the timer AL at step S7 followed by step S8 returning to step S2. Since the pressure increasing command and the pressure holding command are issued successively at step S2, the program flow proceeding from step S3, via steps S5, S6, S7 and S8, to step S2 lasts until the count of the timer T1 becomes equal to or greater than the first preset time period T1. The contents of the timers T and Al are, respectively, shown as T(1) and AL(1) in FIG. 3. As is apparent from FIG. 3, since the content T(1) of the timer T is equal to the first preset time period T1 and the content AL(1) of the timer AL is smaller than the second preset time period T2, a state that the pressure reducing command is not issued during the first preset time period T1 is detected during the second preset time period T2 and thus, it is decided that the wheel speed detecting means 11 is normally functioning.

Since a decision of "YES" is made at step S5 as described above, the timers T and AL are cleared at step S9 and thus, the program flow returns to step S2.

Subsequently, in the same manner as described above, the contents of the timers T and AL based on the hydraulic control commands of FIG. 3 are, respectively, shown as T(2), - - -, T(5) and AL(2), - - -, AL(5), respectively in FIG. 3. All these examples illustrate that a decision is made that the wheel speed detecting means 11 is normally functioning. However, if the pressure reducing command is repeatedly issued at an interval shorter than, for example, the first preset time period T1 and this state lasts the second preset time period T2 or more, a decision of "YES" is made at step S8 and thus, an abnormality detecting processing is performed at step S10. This abnormality detecting processing includes, for example, turning on of a warning lamp, de-energization of the solenoids, supply or cutoff of supply of electric power to the circuit by a fail-safe relay, etc.

The first preset time period T1 should be set to such a length that the wheels are supposed to be naturally locked again. Therefore, the first preset time period T1 may be fixed at a predetermined value but can be set otherwise. For example, in the antiskid control device in which the hydraulic pressure is increased by repeating pressure holding and pressure increase after pressure reduction, the pressure increasing command is generally, in turn, issued continuously by stopping issuance of the pressure holding command at the time when pressure holding and pressure increase have been repeated either for such a time period or such number of times of repetition of pressure holding and pressure increase that the wheels should be naturally locked again. Therefore, the first preset time period T1 may be set to a value corresponding to the above described time period or number of times of repetition of pressure holding and pressure increase.

The second preset time period T2 should be set to such a sufficiently large value that the antiskid control device is capable of functioning normally under severe conditions.

Meanwhile, in the case of control of a plurality of the brake devices, the decision of the detection means 15 may be separately made for each channel or may be made by OR logic regarding pressure reduction and subsequent predetermined time period in the entire antiskid control device.

As is clear from the foregoing description, in accordance with the present invention, even in the case where such a failure occurs that the wheel speed detecting means including the wheel speed sensors generates a skid signal periodically, the time period during which the pressure reducing command is not issued is compared with the proper first predetermined time period. Through the comparison, if it is found that a state in which the time period of the pressure reducing command being not issued is greater than the first predetermined time period is not created for the sufficiently long second predetermined time period, the detection means decides that the wheel speed detecting means is malfunctioning. Therefore, the above described failure can be discriminated and thus, such a risk as loss of the braking force can be eliminated.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A malfunction detector for an antiskid controller and speed sensor comprising:
   means for detecting wheel speed and generating wheel speed signals indicative thereof;
   antiskid processor means for performing arithmetic operations on said wheel speed signals and generating first and second commands for reducing and increasing, respectively, a braking pressure upon detection that wheels are in a trend towards locking and in a trend towards recovery from locking respectively;
   solenoid driving means for driving a plurality of pressure control valves in accordance with said first and second commands, said pressure control valves controlling a plurality of hydraulic circuits;
   a decision means, connected to an output side of said antiskid processor means so as to receive said first command, for determining that a malfunction of the wheel speed detecting means has occurred when a state is detected in which said first command issues more than once during a first predetermined time period, and continues issuing said multiplicity of said first commands for a second predetermined time period.

2. A malfunction detector for an antiskid controller and speed sensor as claimed in claim 1, further comprising:
   motor driving means for driving a motor for a pump in accordance with said first and second commands; and
   means for delivering said first and second commands to said motor driving means.

* * * * *